United States Patent
Dolansky et al.

(10) Patent No.: US 8,915,718 B2
(45) Date of Patent: Dec. 23, 2014

(54) AIRFOIL INCLUDING DAMPER MEMBER

(75) Inventors: Gregory M. Dolansky, Higganum, CT (US); Tracy A. Propheter-Hinckley, Manchester, CT (US); Benjamin T. Fisk, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 553 days.

(21) Appl. No.: 13/454,394

(22) Filed: Apr. 24, 2012

(65) Prior Publication Data

US 2013/0280045 A1 Oct. 24, 2013

(51) Int. Cl.
*F01D 25/04* (2006.01)
*F01D 5/16* (2006.01)

(52) U.S. Cl.
USPC .......................... 416/232; 416/500; 415/119

(58) Field of Classification Search
USPC ........ 416/232, 233, 500; 415/119; 29/889, 72
See application file for complete search history.

(56) References Cited

U.S. PATENT DOCUMENTS

| | | | |
|---|---|---|---|
| 2,343,918 A | | 5/1943 | McCoy |
| 2,689,107 A | * | 9/1954 | Odegaard ...................... 416/233 |
| 2,828,941 A | * | 4/1958 | Foley ......................... 416/231 R |
| 4,441,859 A | | 4/1984 | Sadler |
| 4,484,859 A | | 11/1984 | Pask et al. |
| 4,815,939 A | | 3/1989 | Doble |
| 5,038,014 A | | 8/1991 | Pratt et al. |
| 5,165,860 A | | 11/1992 | Stoner et al. |
| 5,558,497 A | | 9/1996 | Kraft et al. |
| 5,709,527 A | * | 1/1998 | Ernst et al. ....................... 415/10 |
| 5,820,343 A | * | 10/1998 | Kraft et al. .................. 416/96 A |
| 5,837,960 A | | 11/1998 | Lewis et al. |
| 6,155,789 A | * | 12/2000 | Mannava et al. .......... 416/241 R |
| 6,283,707 B1 | * | 9/2001 | Chin ........................... 416/96 A |
| 6,391,251 B1 | | 5/2002 | Keicher et al. |
| 6,450,769 B2 | * | 9/2002 | Szwedowicz ................. 416/190 |
| 6,607,359 B2 | * | 8/2003 | von Flotow ............... 416/229 R |
| 6,669,447 B2 | | 12/2003 | Norris et al. |
| 6,688,439 B2 | * | 2/2004 | Bhattacharya et al. ....... 188/267 |
| 7,029,232 B2 | | 4/2006 | Tuffs et al. |
| 7,112,044 B2 | | 9/2006 | Whitehead et al. |
| 7,121,800 B2 | | 10/2006 | Beattie |
| 7,121,801 B2 | | 10/2006 | Surace et al. |
| 7,125,225 B2 | | 10/2006 | Surace et al. |
| 7,217,093 B2 | | 5/2007 | Propheter et al. |
| 7,270,517 B2 | | 9/2007 | Garner |

(Continued)

OTHER PUBLICATIONS

International Search Report and Written Opinion for International Application No. PCT/US2013/037499 completed on Jul. 24, 2013.

*Primary Examiner* — Igor Kershteyn
(74) *Attorney, Agent, or Firm* — Carlson, Gaskey & Olds, P.C.

(57) ABSTRACT

An airfoil includes an airfoil body that defines a longitudinal axis. The airfoil body includes a leading edge and a trailing edge and a first sidewall and a second sidewall that is faced apart from the first sidewall. The first sidewall and the second sidewall join the leading edge and the trailing edge and at least partially define a cavity in the airfoil body. A damper member is enclosed in the cavity. The damper member includes a first end and a second end. The first end is connected in a first joint to the first sidewall at a first longitudinal location and the second end is connected in a second joint to the second sidewall at a second, different longitudinal location.

21 Claims, 6 Drawing Sheets

(56) References Cited

U.S. PATENT DOCUMENTS

| | | |
|---|---|---|
| 7,478,994 B2 | 1/2009 | Cunha et al. |
| 7,824,158 B2 * | 11/2010 | Bauer et al. .................. 416/232 |
| 2004/0253115 A1 | 12/2004 | Williams et al. |
| 2008/0290215 A1 | 11/2008 | Udall et al. |
| 2009/0258168 A1 | 10/2009 | Barcock et al. |
| 2009/0304497 A1 | 12/2009 | Meier et al. |
| 2011/0048664 A1 | 3/2011 | Kush et al. |

* cited by examiner

AIRFOIL INCLUDING DAMPER MEMBER

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures within the airfoil. The die casting technique inherently limits the geometry, size, wall thickness and location of airfoil structures. Thus, the design of a traditional airfoil is limited to structures that can be manufactured using the die casting technique, which in turn may limit the performance of the airfoil.

SUMMARY

An airfoil according to an exemplary aspect of the present disclosure includes an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A damper member is enclosed in the cavity and includes a first end and a second end. The first end is connected in a first joint to the first side wall at a first longitudinal location and the second end is connected in a second joint to the second side wall at a second, different longitudinal location.

In a further non-limiting embodiment of the above example, at least one of the first joint and the second joint is an articulated joint.

In a further non-limiting embodiment of any of the foregoing examples, the articulated joint includes a socket and a socket member movably interlocked with the socket.

In a further non-limiting embodiment of any of the foregoing examples, the socket member is irremovably interlocked with the socket such that the socket member cannot be removed from the socket non-destructively.

In a further non-limiting embodiment of any of the foregoing examples, the socket is fixed on one of the first sidewall or the second sidewall.

In a further non-limiting embodiment of any of the foregoing examples, the socket is longitudinally elongated.

In a further non-limiting embodiment of any of the foregoing examples, the socket member is longitudinally elongated.

In a further non-limiting embodiment of any of the foregoing examples, the socket member is connected to a support arm and the socket member is enlarged relative to the support arm.

In a further non-limiting embodiment of any of the foregoing examples, the socket includes socket sidewalls that define an opening through which the support arm extends.

In a further non-limiting embodiment of any of the foregoing examples, the opening is smaller than the socket member such that the socket member cannot fit through the opening.

In a further non-limiting embodiment of any of the foregoing examples, the support arm is inclined relative to the longitudinal axis.

A further non-limiting embodiment of any of the foregoing examples includes an open gap between the socket and the socket member.

In a further non-limiting embodiment of any of the foregoing examples, the open gap surrounds the socket member such that the socket member is free of contact with the socket.

In a further non-limiting embodiment of any of the foregoing examples, the socket member is a ball.

In a further non-limiting embodiment of any of the foregoing examples, the socket member includes an inclined bearing surface relative to the longitudinal axis.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section include an airfoil having an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A damper member is enclosed in the cavity and includes a first end and a second end. The first end is connected in a first joint to the first side wall at a first longitudinal location and the second end is connected in a second joint to the second side wall at a second, different longitudinal location.

In a further non-limiting embodiment of any of the foregoing examples, at least one of the first joint and the second joint is an articulated joint.

In a further non-limiting embodiment of any of the foregoing examples, the articulated joint includes a socket and a socket member movably interlocked with the socket.

In a further non-limiting embodiment of any of the foregoing examples, the socket member is connected to a support arm and the socket member is enlarged relative to the support arm, the socket including socket sidewalls that define an opening through which the support arm extends, and the opening is smaller than the socket member such that the socket member cannot fit through the opening.

A further non-limiting embodiment of any of the foregoing examples includes an open gap between the socket and the socket member, and the open gap surrounds the socket member such that the socket member is free of contact with the socket.

A method for processing an airfoil according to an exemplary aspect of the present disclosures includes depositing multiple layers of a powdered metal onto one another, joining the layers to one another with reference to data relating to a particular cross-section of an airfoil, and producing the airfoil with an airfoil body that includes a longitudinal axis, a leading edge and a trailing edge and a first side wall and a second side wall that is spaced apart from the first side wall. The first side wall and the second side wall join the leading edge and the trailing edge and at least partially define a cavity in the airfoil body. A damper member is enclosed in the cavity and includes a first end and a second end. The first end is connected in a first joint to the first side wall at a first longitudinal location and the second end is connected in a second joint to the second side wall at a second, different longitudinal location.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5A shows a cross-section of an airfoil in a mode of sinusoidal vibration.

FIG. 6A shows a cross-section of the airfoil of FIG. 5A in another phase of sinusoidal vibration.

DETAILED DESCRIPTION OF THE PREFERRED EMBODIMENT

Figure 1:
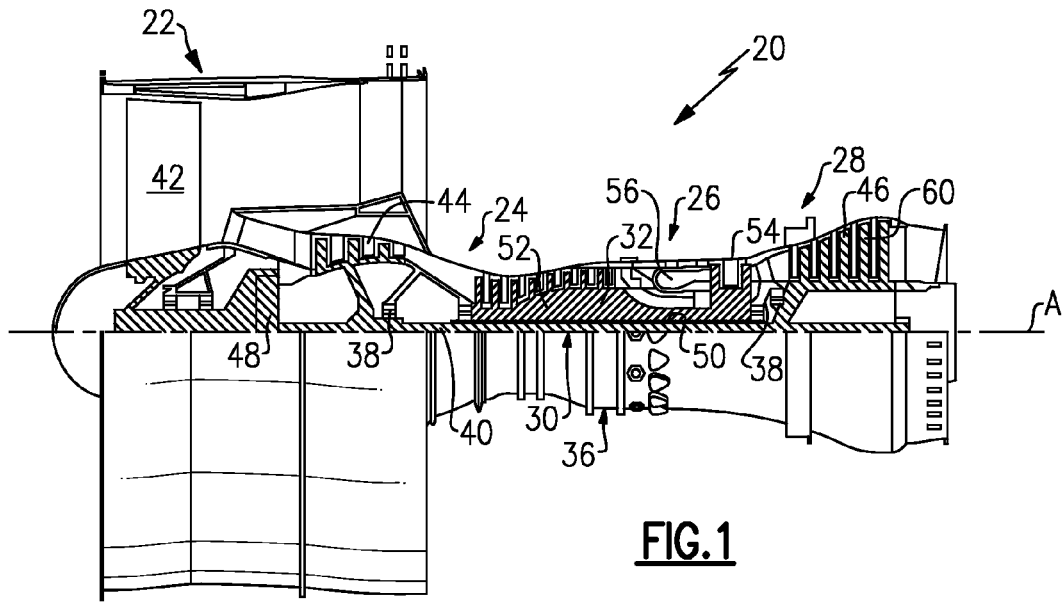
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures or ground based turbines that do not include the fan section 22.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
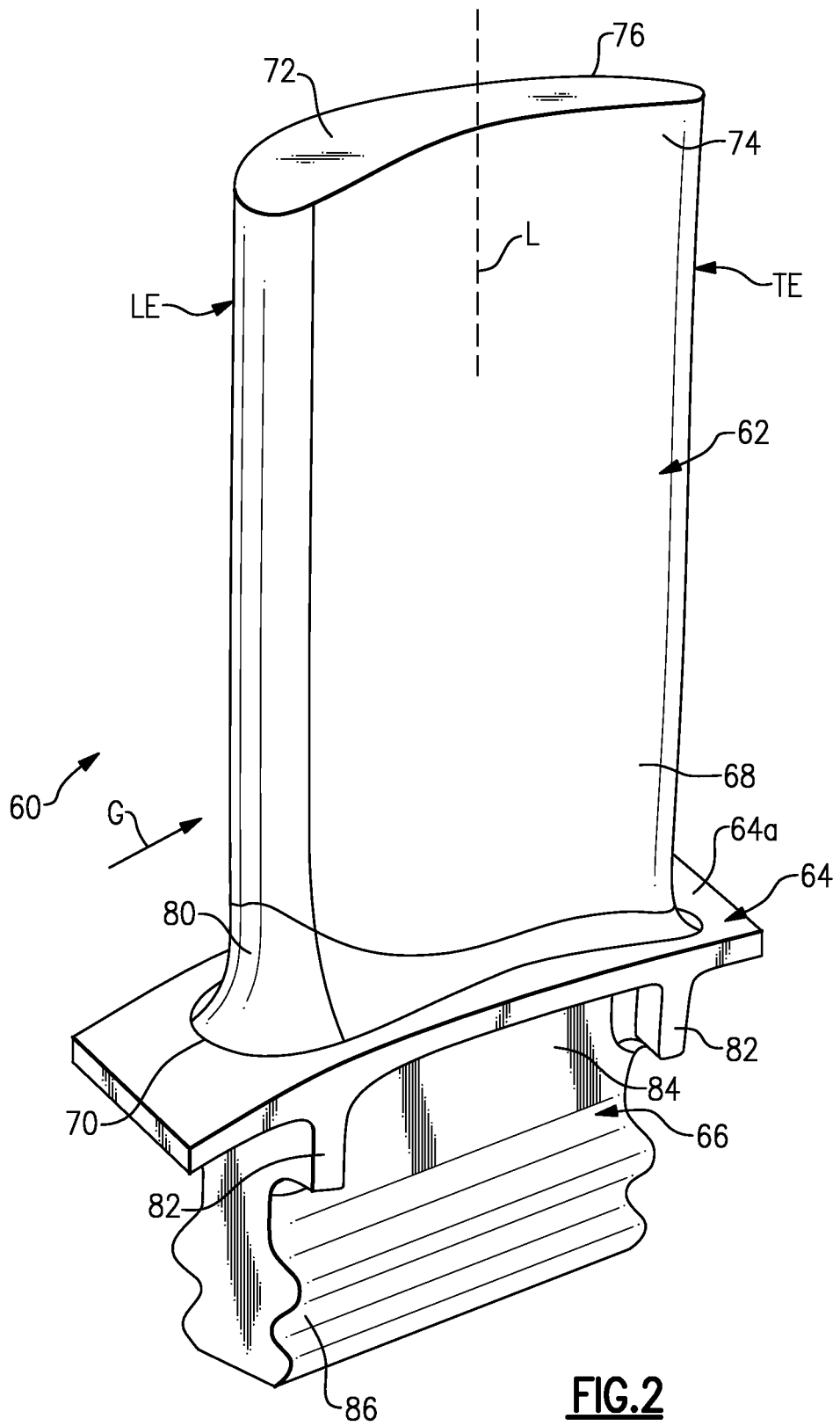
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (pressure side) and a second side wall 76 (suction side) that is spaced apart from the first side wall 74. The first side wall 74 and the second side wall 76 join the leading edge (LE) and the trailing edge (TE) and at least partially define a cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
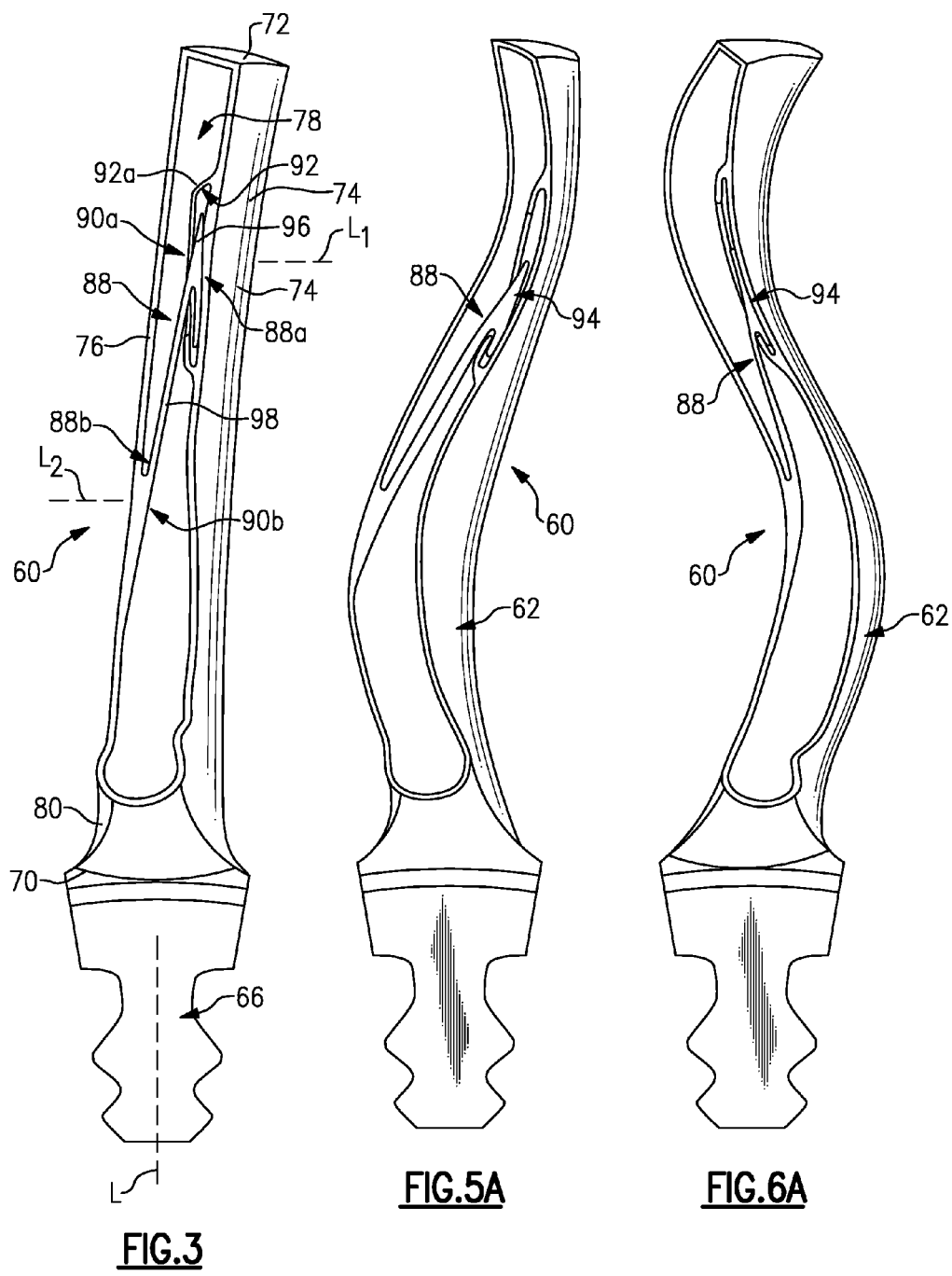
FIG. 3 shows a sectioned view of the airfoil of FIG. 2.

Referring to FIG. 3, the airfoil 60 includes a damper member 88 enclosed in the cavity 78. The damper member 88 includes a first end 88a and a second end 88b. The first end 88a is connected in a first joint 90a to the first sidewall 74 at a first longitudinal location $L_1$ and the second end 88b is connected in a second joint 90b to the second sidewall 76 at a second, different longitudinal location $L_2$. In this example, the first joint 90a is an articulated joint and the second joint 90b is a rigid joint. It is to be understood that, alternatively, the first joint 90a could be a rigid joint and the second joint 90b could be an articulated joint to change the mass distribution in the airfoil, for example.

Figure 4:
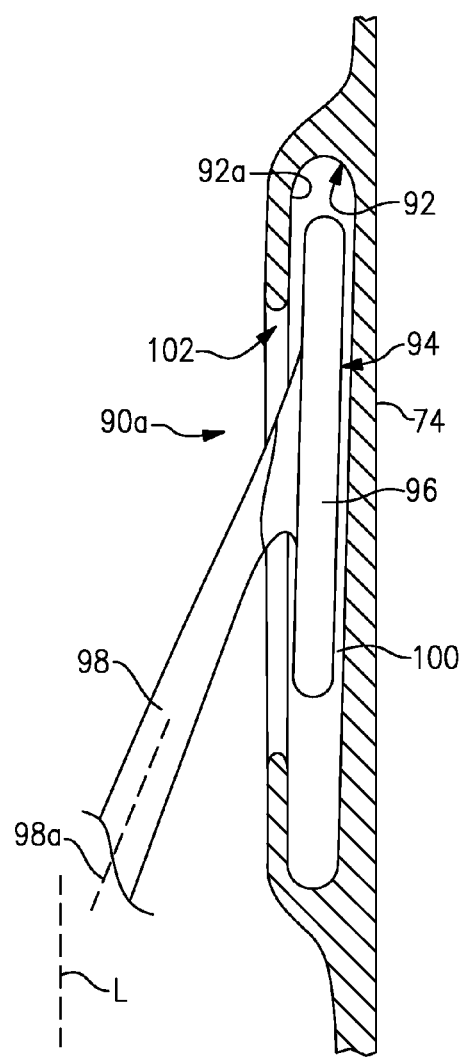
FIG. 4 shows a cross-section of an articulated joint of a damper member of the airfoil of FIG. 2.

FIG. 4 illustrates an expanded view of the first joint 90a. The first joint 90a includes a socket 92 that is fixed on the first sidewall 74 and a socket member 94 that is movably interlocked with the socket 92. In this example, the socket member 94 includes a longitudinally elongated portion 96 that is connected to a support arm 98. The socket 92 itself is also longitudinally elongated and is generally sized larger than the longitudinally elongated portion 96 such that there is an open gap 100 between the socket member 94 and a socket 92. In this example, the airfoil 60 is in a static condition and the open gap 100 surrounds the socket member 94 such that the socket member 94 is free of any contact with the socket 92. That is, the socket member 94 does not contact socket sidewalls 92a that form the socket 92.

The socket sidewalls 92a extend from the first sidewall 74 and, in this example, together with the first sidewall 74 define the socket 92. The socket sidewalls 92a also define an opening 102 through which the support arm 98 extends. In this example, the opening 102 is smaller in longitudinal span than the longitudinal span of the longitudinally elongated portion 96 of the socket member 94 such that at least the longitudinally elongated portion 96 cannot fit through the opening 102. Thus, the socket member 94 is interlocked with the socket 92 such that the socket member 94 cannot be non-destructively removed from the socket 92 without destroying at least one or the other of the socket member 94 or the socket 92.

In the illustrated example, the support arm 98 defines a central axis 98a such that the support arm 98 is inclined relative to the longitudinal axis L. The support arm 98 extends downwardly from the longitudinally elongated portion 96 to the second end 88b of the socket member 94. Referring to FIG. 3, the second end 88b of the socket member 94 is rigidly fixed to the second sidewall 76 in this example. That is, the second joint 90b is a rigid joint rather than an articulated joint.

Figure 5B:
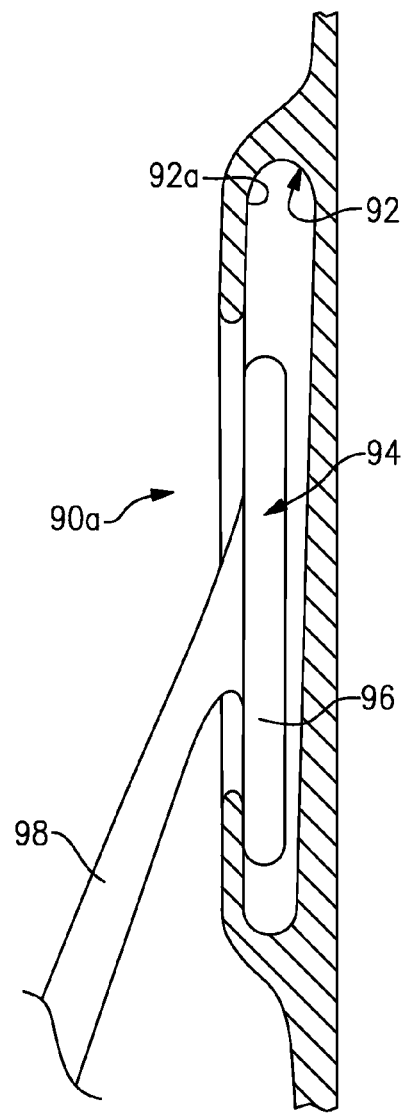
FIG. 5B shows a cross-section of an articulated joint of the airfoil of FIG. 5A.
Figure 6B:
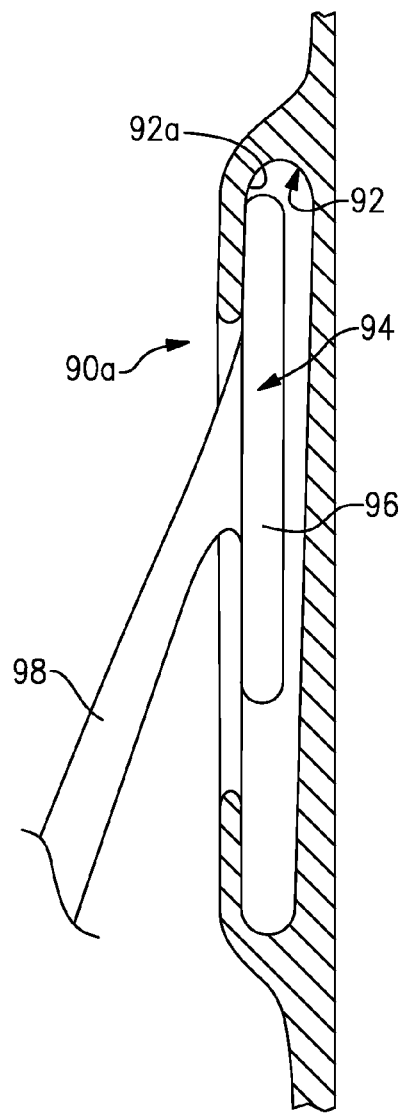
FIG. 6B shows a cross-section of an articulated joint of the airfoil of FIG. 6A.

Referring to FIGS. 5A and 5B that illustrate the airfoil 60 in a mode of sinusoidal vibration (e.g., a second beam mode) and FIGS. 6A and 6B that illustrate the airfoil 60 in another phase of sinusoidal vibration, the damper member 88 of the airfoil 60 serves to dampen sinusoidal vibrations of the airfoil 60. It is to be understood that the illustrated sinusoidal vibrations are highly exaggerated in the drawings for the purpose of description. As depicted in FIGS. 5A and 6A, sinusoidal vibration refers to the airfoil 60 deflecting in a sinusoidal wave shape such that certain portions swing to the left in the figures and other potions swing to the right in the figures, while some portions remain relatively centered.

In operation of the airfoil 60, at least the airfoil portion 62 experiences sinusoidal vibrations that can debit the performance of the airfoil 60 or limit operation of the engine 20, for example. As the airfoil 60 sinusoidally vibrates, the socket member 94 of the damper member 88 contacts the socket sidewalls 92a of the socket 92. The contact causes friction that removes energy from the system and limits relative movement between the socket member 94 and the socket 92. Because the socket member 94 is connected to the second sidewall 76 through the second joint 90b and is connected to the first sidewall 74 through the articulated, first joint 90a, the friction thus limits relative movement between the first sidewall 74 and the second sidewall 76. The limiting of the relative movement between the sidewalls 74 and 76 thus serves to dampen sinusoidal vibrations in the airfoil 60.

As shown in FIG. 5B in the first mode of sinusoidal vibration, a lower portion of the longitudinally elongated portion 96 of the socket member 94 contacts the socket sidewall 92a. As shown in FIG. 6B, in the second mode of sinusoidal vibration, an upper portion of the longitudinally elongated portion 96 of the socket member 94 contacts a different section of the socket sidewall 92a. Thus, as the airfoil 60 cycles between different sinusoidal vibrational modes, different portions of the socket member 94 contact different portions of the socket 92 to thereby limit relative movement between the sidewalls 74 and 76 of the airfoil 60.

Additionally, as can be appreciated, the relative longitudinal locations $L_1$ and $L_2$ of the respective first joint 90a and second joint 90b can be tailored in a design stage to dampen particular target frequencies. That, the longitudinal locations $L_1$ and $L_2$ of the respective first joint 90a and second joint 90b are positioned at peaks of the sinusoidal vibration modes to effectively dampen those modes. Thus, by designing the longitudinal locations $L_1$ and $L_2$ of the respective first joint 90a and second joint 90b to be at the peaks, the damper member 88 is tuned to a specific sinusoidal vibration mode.

Figure 7:
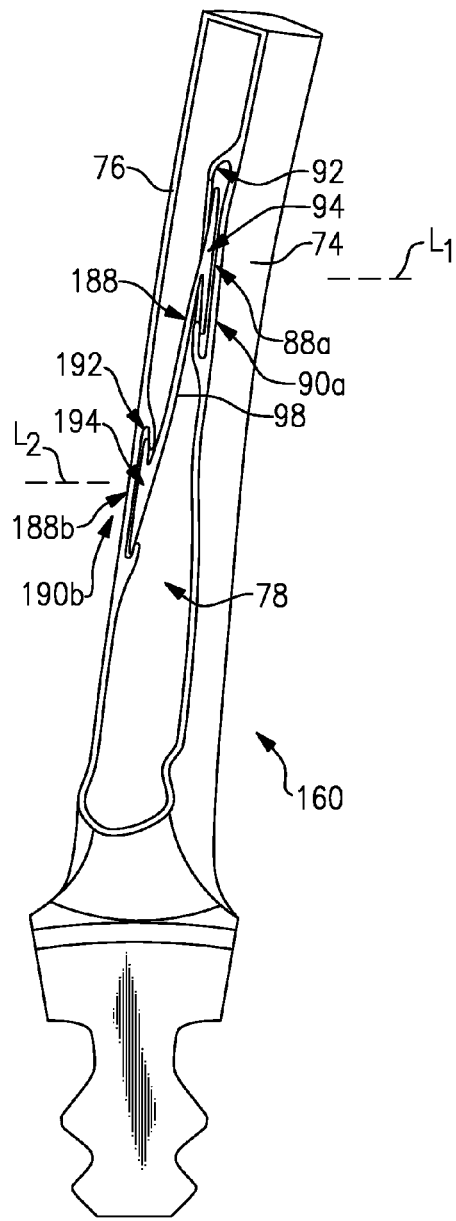
FIG. 7 shows a sectioned view of another example airfoil.

FIG. 7 illustrates a modified airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 includes a damper member 188 that is similar to the damper member 88 except that the second joint 190b is an articulated joint rather than the rigid joint. Similar to the articulated, first joint 90a, the articulated, second joint 190b includes a socket member 194 that is moveably interlocked in a socket 192. Thus, the damper member 188 includes articulated joints at each ends that are tied, respectively, to the first sidewall and the second sidewall 76 of the airfoil 160.

In operation, the socket members 94 and 194 contact portions of the respective sockets 92 and 192 to frictionally absorb energy and limit relative movement between the sidewalls 74 and 76, similar to as described above. Because there are two articulated joints, there is more energy absorbed and therefore a greater dampening effect.

Figure 8:
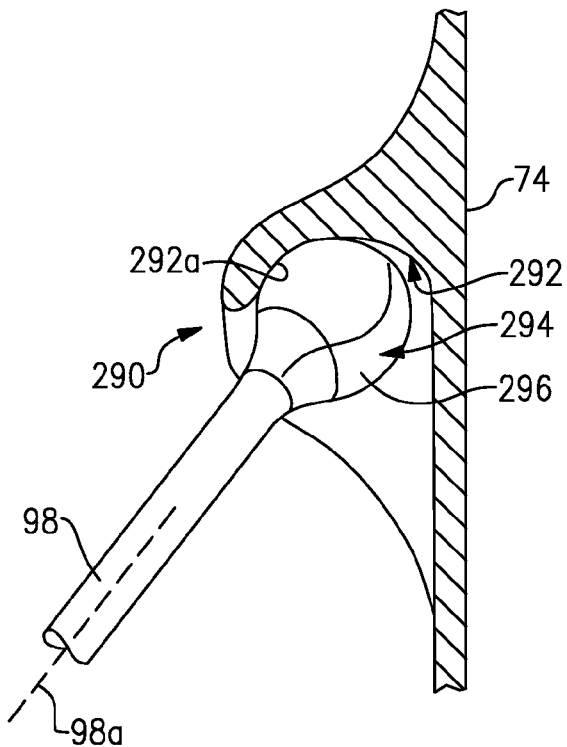
FIG. 8 shows a cross-section of another example articulated joint with a ball socket member.

FIG. 8 illustrates a modified joint 290 that can be used in place of the first joint 90a, the second joint 90b and/or the second joint 190b. In general, different shapes of a socket and a socket member can be used to target specific vibrational modes and provide different degrees of dampening. That is, the shapes of a socket and a socket member control the contact area that is subject to friction and thus control dampening. By changing the shape, the dampening can be tuned to a target vibrational mode. In this example, the socket member 294 is a ball 296 that is moveably interlocked with the socket 292. In operation, the ball 296 of the socket member 294 contacts the socket sidewall 292a to provide friction and dampening, similar to as described above.

Figure 9:
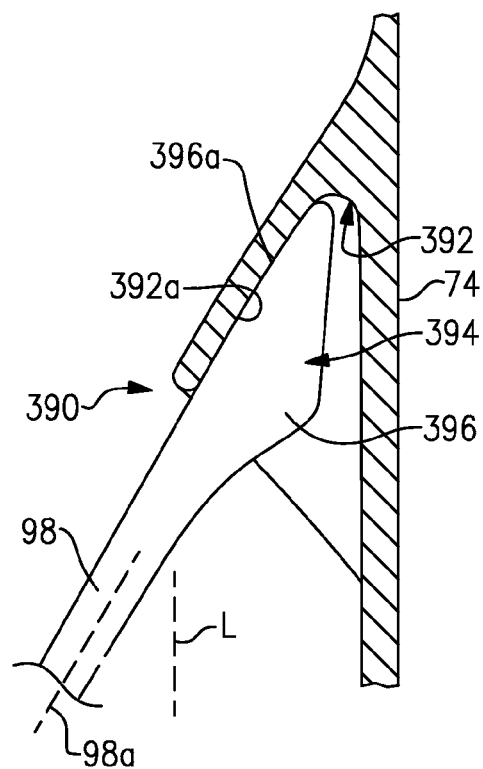
FIG. 9 shows a cross-section of another example articulated joint with a wedge socket member having an inclined surface.

FIG. 9 illustrates another modified joint 390 that, similar to the joint 290, can be used in place of the first joint 90a, the second joint 90b and/or the second joint 190b. In this example, the socket member 394 includes a wedge 396 that has an inclined surface 396a. The inclined surface 396a is inclined relative to the longitudinal axis L. In operation, the inclined surface 396a of the socket member 394 contacts the socket sidewall 392a to provide friction and dampening, similar to as described above.

Figure 10:
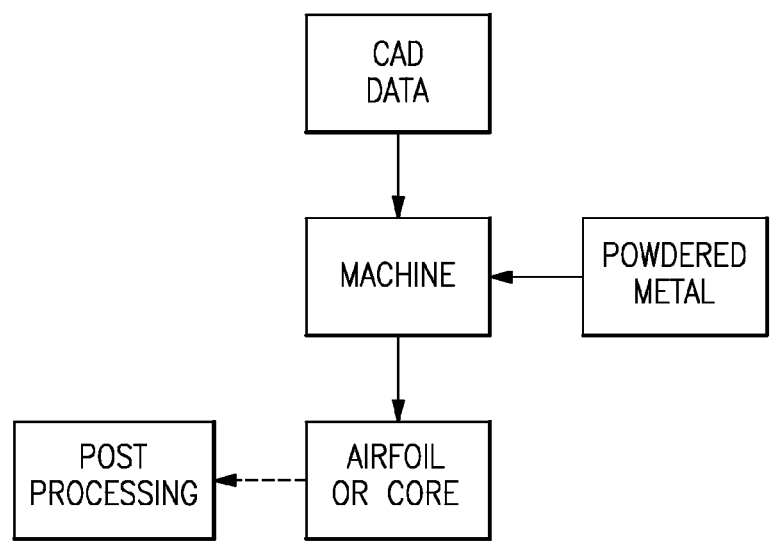
FIG. 10 shows a method of processing an airfoil using an additive manufacturing process.

The geometries disclosed herein may be difficult to form using conventional casting technologies. Thus, a method of processing an airfoil having the features disclosed herein includes an additive manufacturing process, as schematically illustrated in FIG. 10. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body; and
   a damper member enclosed in the cavity, the damper member including a first end and a second end, the first end being connected in a first joint to the first side wall at a first longitudinal location and the second end being connected in a second joint to the second side wall at a second, different longitudinal location.

2. The airfoil as recited in claim 1, wherein at least one of the first joint and the second joint is an articulated joint.

3. The airfoil as recited in claim 2, wherein the articulated joint includes a socket and a socket member movably interlocked with the socket.

4. The airfoil as recited in claim 3, wherein the socket member is irremovably interlocked with the socket such that the socket member cannot be removed from the socket non-destructively.

5. The airfoil as recited in claim 3, wherein the socket is fixed on one of the first sidewall or the second sidewall.

6. The airfoil as recited in claim 3, wherein the socket is longitudinally elongated.

7. The airfoil as recited in claim 3, wherein the socket member is longitudinally elongated.

8. The airfoil as recited in claim 3, wherein the socket member is connected to a support arm and the socket member is enlarged relative to the support arm.

9. The airfoil as recited in claim 8, wherein the socket includes socket sidewalls that define an opening through which the support arm extends.

10. The airfoil as recited in claim 9, wherein the opening is smaller than the socket member such that the socket member cannot fit through the opening.

11. The airfoil as recited in claim 8, wherein the support arm is inclined relative to the longitudinal axis.

12. The airfoil as recited in claim 3, further including an open gap between the socket and the socket member.

13. The airfoil as recited in claim 12, wherein the open gap surrounds the socket member such that the socket member is free of contact with the socket.

14. The airfoil as recited in claim 3, wherein the socket member is a ball.

15. The airfoil as recited in claim 3, wherein the socket member includes an inclined bearing surface relative to the longitudinal axis.

16. A turbine engine comprising:
   optionally, a fan;
   a compressor section;
   a combustor in fluid communication with the compressor section; and
   a turbine section in fluid communication with the combustor, the turbine section being coupled to drive the compressor section and the fan, and
   at least one of the fan, the compressor section and the turbine section including an airfoil having an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body, and a damper member enclosed in the cavity, the damper member including a first end and a second end, the first end being connected in a first joint to the first side wall at a first longitudinal location and the second end being connected in a second joint to the second side wall at a second, different longitudinal location.

17. The turbine engine as recited in claim 16, wherein at least one of the first joint and the second joint is an articulated joint.

18. The turbine engine as recited in claim 17, wherein the articulated joint includes a socket and a socket member movably interlocked with the socket.

19. The turbine engine as recited in claim 18, wherein the socket member is connected to a support arm and the socket member is enlarged relative to the support arm, the socket including socket sidewalls that define an opening through which the support arm extends, and the opening is smaller than the socket member such that the socket member cannot fit through the opening.

20. The turbine engine as recited in claim 18, further including an open gap between the socket and the socket member, and the open gap surrounds the socket member such that the socket member is free of contact with the socket.

21. A method for processing an airfoil, the method comprising:
   depositing multiple layers of a powdered metal onto one another;
   joining the layers to one another with reference to data relating to a particular cross-section of an airfoil; and
   producing the airfoil with an airfoil body including a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body and a damper member enclosed in the cavity, the damper member including a first end and a second end, the first end being connected in a first joint to the first side wall at a first longitudinal location and the second end being connected in a second joint to the second side wall at a second, different longitudinal location.

* * * * *